US006957903B2

(12) United States Patent
Arakawa et al.

(10) Patent No.: US 6,957,903 B2
(45) Date of Patent: Oct. 25, 2005

(54) TAIL LAMP FOR VEHICLE

(75) Inventors: Kuniaki Arakawa, Wako (JP); Takashi Arai, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 60 days.

(21) Appl. No.: 10/715,601

(22) Filed: Nov. 17, 2003

(65) Prior Publication Data

US 2004/0130906 A1    Jul. 8, 2004

(30) Foreign Application Priority Data

Nov. 22, 2002  (JP)  ............................. 2002-339964
Dec. 9, 2002   (JP)  ............................. 2002-356656
Oct. 6, 2003   (JP)  ............................. 2003-347077

(51) Int. Cl.⁷ ............................................. F21V 13/04
(52) U.S. Cl. ...................... 362/545; 362/541; 362/543; 362/544; 362/800
(58) Field of Search ................................ 362/543–545, 362/473, 540–541, 800; 340/475, 479

(56) References Cited

U.S. PATENT DOCUMENTS 4,733,335 A * 3/1988 Serizawa et al. ............ 362/503
5,406,465 A * 4/1995 Farchione ................... 362/473
5,707,130 A * 1/1998 Zwick et al. ................ 362/517
6,053,626 A * 4/2000 Zagrodnik et al. .......... 362/473
6,371,636 B1 * 4/2002 Wesson ....................... 362/545
6,793,384 B2 * 9/2004 Ban et al. .................... 362/473

FOREIGN PATENT DOCUMENTS

JP       6-156341       6/1994

* cited by examiner

Primary Examiner—Thomas M. Sember
Assistant Examiner—James W Cranson, Jr.
(74) Attorney, Agent, or Firm—Hamre, Schumann, Mueller & Larson, P.C.

(57) ABSTRACT

A tail lamp apparatus is provided which makes it possible to assemble a position lamp and a stop lamp readily to a fairing and is superior in visibility from the backward. A tail lamp includes an upper lamp portion and a lower lamp portion. An LED serving as a position lamp is provided on the upper lamp portion, and a plurality of LEDs serving as a stop lamp are provided on the lower lamp portion. A board for mounting the LEDs thereon is disposed in a stepwise configuration and is disposed in a V shape such that it envelopes the tail lamp from below. A base having a reflector for the LED at a portion thereof and holding the board thereon has a peripheral edge formed as a flat face so as to facilitate coupling of the base to a rear body cover.

12 Claims, 8 Drawing Sheets

TAIL LAMP FOR VEHICLE

FIELD OF THE INVENTION

This invention relates to a tail lamp for a vehicle, and more particularly to a tail lamp for a vehicle allowing simplification of the attachment structure and allowing improvement in the visibility from the rear.

BACKGROUND OF THE INVENTION

A tail lamp apparatus including a position lamp and a stop lamp and a blinker lamp are typically at a rear portion of a vehicle such as a motorcycle. Generally, all or some of the position lamp, stop lamp and blinker lamp are formed as a unitary combination lamp. For example, Japanese Patent Laid-Open No. Hei 6-156341 proposes a lamp apparatus wherein a position lamp and a blinker lamp are formed as a unitary combination lamp and a high mount lamp, that is, a stop lamp, is attached above the combination lamp. The stop lamp is formed from a plurality of light emitting diodes (LEDs) arranged in a horizontal row above the combination lamp.

The conventional lamp apparatus described above can be formed with a reduced upward and downward height because the LEDs are arranged in a horizontal row. However, this configuration is limited in variations for the appearance of the rear portion of the vehicle body.

Further, according to the conventional tail lamp apparatus, since a bulb and the LEDs which form the lamp apparatus are attached to a rear body cover, the shape of the rear body cover is complicated, and as a result, the shape of a rear cowl to be coupled to the rear body cover is also complicated. Accordingly, the metal mold for producing the rear cowl is also complicated, and in some cases, rapping may be impossible.

Therefore, a need exists for a lamp apparatus which can provide a good appearance to a rear portion of a vehicle body through a free layout.

A need also exists for a tail lamp for a vehicle which is simplified in shape and structure to facilitate an attaching operation thereof to a body frame, a cowl or the like.

Finally, a need exists for a tail lamp for a vehicle which has good visibility and long life.

SUMMARY OF THE INVENTION

In an embodiment, a tail lamp for a vehicle is provided that includes a stop lamp disposed below a position lamp attached to a rear portion of a vehicle body and that the stop lamp is formed from a light emitting diode group disposed in an array including a substantially V-shaped row formed such that the opposite ends thereof are positioned higher than a central portion thereof.

In an embodiment, a tail lamp for a vehicle is provided that has a plurality of light emitting diodes which form the light emitting diode group of the stop lamp disposed in a plurality of stages from an upper portion toward a lower portion of the vehicle body and disposed in a successively forwardly displaced relationship of the vehicle body from the upper portion to the lower portion.

In an embodiment, a tail lamp includes a reflector provided at an upper portion of a base member attached to a rear portion of a vehicle body and a position lamp attached to the reflector, a stop lamp provided at a lower portion of the base member and formed from a plurality of light emitting diodes, and a lens adhered to the base member for covering the position lamp and the stop lamp.

In an embodiment, a tail lamp for a vehicle has a base member with, on a peripheral edge thereof, a flat joining face attached to the rear portion of the vehicle body.

In an embodiment, a tail lamp for a vehicle has light emitting diodes attached to a board provided on a base member, and the board is disposed in a plurality of stages from an upper portion to a lower portion of the vehicle body and is disposed in a successively forwardly displaced relationship of the vehicle body from the upper portion to the lower portion.

In an embodiment, a tail lamp for a vehicle has a lens that is divided into a lens for the position lamp and a lens for the stop lamp, and a boundary line between the lens for the stop lamp and the lens for the position lamp above the lens for the stop lamp is formed in a substantially V shape.

In an embodiment, a tail lamp for a vehicle has a position lamp that is formed from light emitting diodes, and the stop lamp is energized when the vehicle is not braked with electric current that is lower than when the vehicle is braked, so as to function as a second position lamp together with the position lamp.

DRAWINGS

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

In an embodiment, the stop lamp is laid out with a width in the upward and downward directions in an array including a substantially V-shaped row. Therefore, different from a stop lamp with a horizontal row, the visibility of the stop lamp as viewed from an obliquely rearwardly upward position is good although the stop lamp is disposed at a lower portion of the tail lamp, that is, below the position lamp. Particularly because of a high responsibility and sharp light emission of the light emitting diodes, a high degree of visibility is obtained. Further, according to an embodiment, since the stop lamp can be laid out three-dimensionally such that it extends along a lower face of a rear body cover of the vehicle body, it is superior in appearance. Further, since the light emitting diodes are arranged two-dimensionally such that the stop lamp can be formed from a large number of light emitting diodes, a light emitting face of a wide area can be assured, and the visibility is augmented.

Further, in an embodiment, the light emitting diodes are arranged obliquely such that they go down stepwise from the backward to the front of the vehicle body and they can be laid out along a rear body cover having an inclined outline. Further, since the light emitting diodes are disposed three-dimensionally, a light emitting face of a large area can be assured, and the visibility is augmented.

In an embodiment, an assembly wherein the position lamp and the stop lamp are attached to the base member so as to form a unitary member can be attached to the rear portion of the vehicle body. Since the joining face of the base member with the rear portion of the vehicle body has a flattened shape, in an embodiment, shaping of the rear body cover and so forth of the vehicle body is easy.

A sense of unity can be provided to light emitting faces of the position lamp and the stop lamp. Accordingly, a vehicle body image of a new sense by synthesis of lights different from each other from the bulb and the light emitting diodes can be produced.

In an embodiment, where the stop lamp functions as a position lamp, a high degree of visibility can be anticipated through lighting of the great number of light emitting diodes. Where the lamp to be used as the position lamp is formed from LEDs, a sufficiently high luminance as the position lamp can be obtained. Further, a longer life can be achieved when compared with an alternative configuration that uses a bulb.

High visibility preferably for a stop lamp can be obtained through a high responsibility and sharp light emission of the light emitting diodes.

Figure 2:
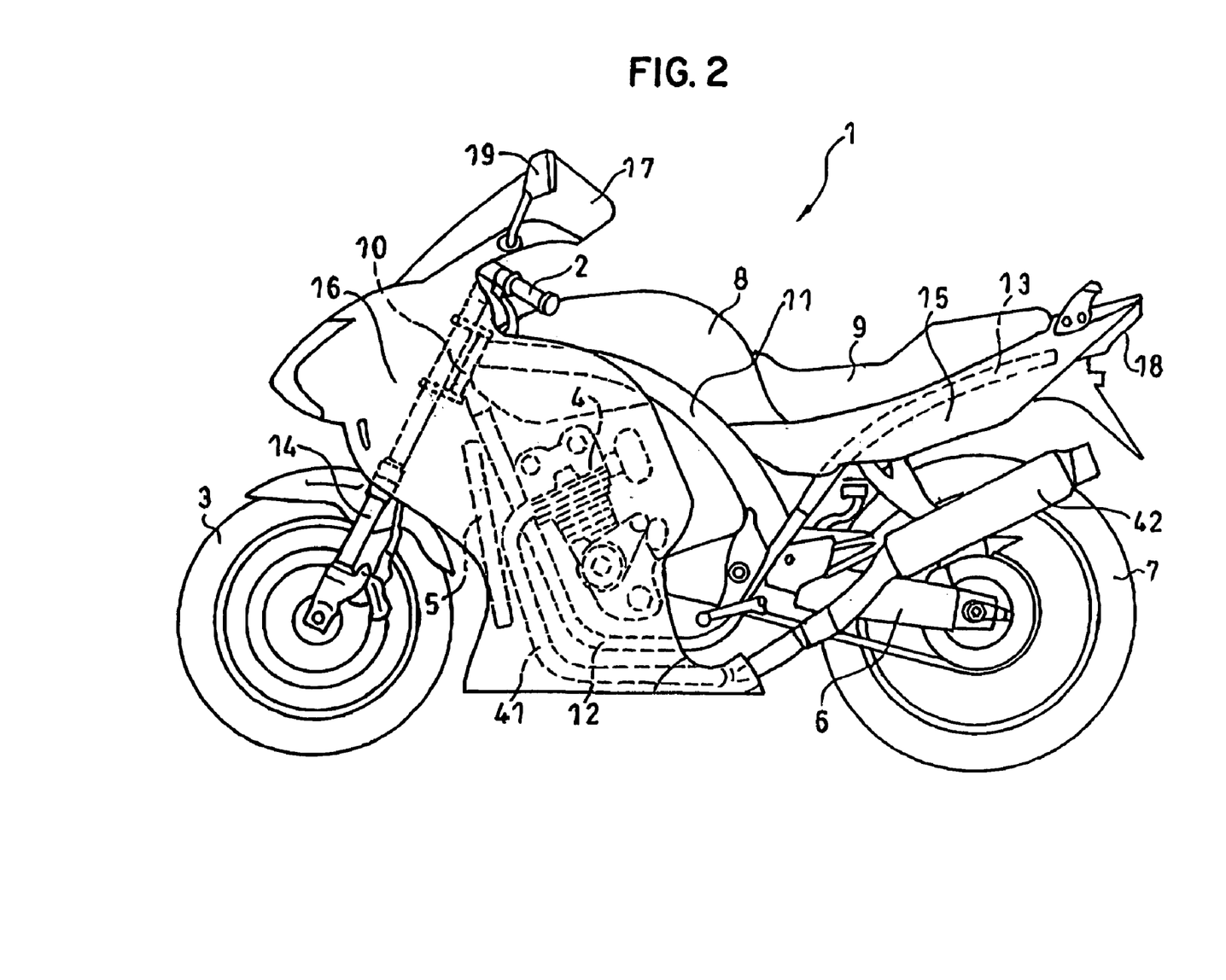
FIG. 2 is a side elevational view of a motorcycle to which the tail lamps according to the first and second embodiments of the present invention are suitably applied.

In the following, an embodiment of the present invention is described with reference to the drawings. FIG. 2 is a side elevational view of a motorcycle including a tail lamp according to an embodiment of the present invention. Referring to FIG. 2, the motorcycle 1 includes a body frame which in turn includes a head pipe 10 positioned at a front portion of a vehicle body, a main frame 11 extending rearwardly downwards from the head pipe 10, and a lower frame 12 coupled at a front end thereof to a lower end of the main frame 11 and extending rearwardly. A rear portion of the lower frame 12 further extends upwardly and forms a rear frame 13.

A handle bar 2 is provided on a top bridge connected to an upper portion of the head pipe 10. A front wheel 3 is supported by a front fork 14 extending downwardly from the head pipe 10. An engine 4 is carried between the main frame 11 and the lower frame 12. The engine 4 may be a water-cooled four-cylinder engine, and a radiator 5 is provided forwardly of the engine 4.

A rear wheel 7 is supported on a stay 6 which extends rearwardly from the body frame, and power is transmitted from the engine 4 to the rear wheel 7 through a transmission and a clutch. An exhaust pipe 41 of the engine 4 extends rearwardly and is connected to a pair of mufflers 42. The mufflers 42 are provided on the left and right of the vehicle body.

A fuel tank 8 is provided above the engine 4, and a seat 9 is positioned at an upper portion of the rear frame 13 rearwardly of the fuel tank 8. A lower portion of the seat 9 is covered with a rear cover 15. A tail lamp 18 is attached to a rear portion of the rear cover 15. A front portion of the vehicle body is covered with a cowl 16, and a headlamp is built in a front portion of the cowl 16. Further, a windshield 17 is provided at an upper portion of the cowl 16, and a pair of back mirrors 19 are provided on the windshield 17 such that they are distributed leftwardly and rightwardly.

Figure 1:
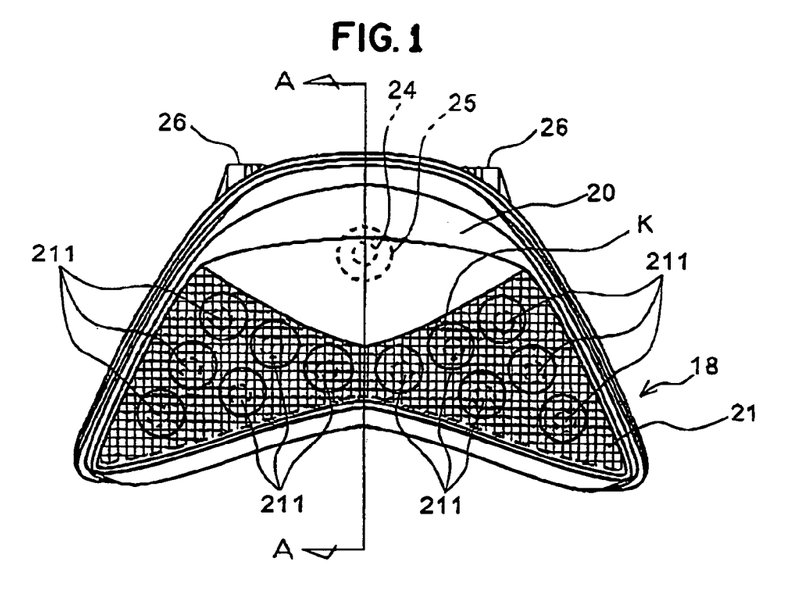
FIG. 1 is a front elevational view of a tail lamp according to a first embodiment of the present invention.
Figure 3:
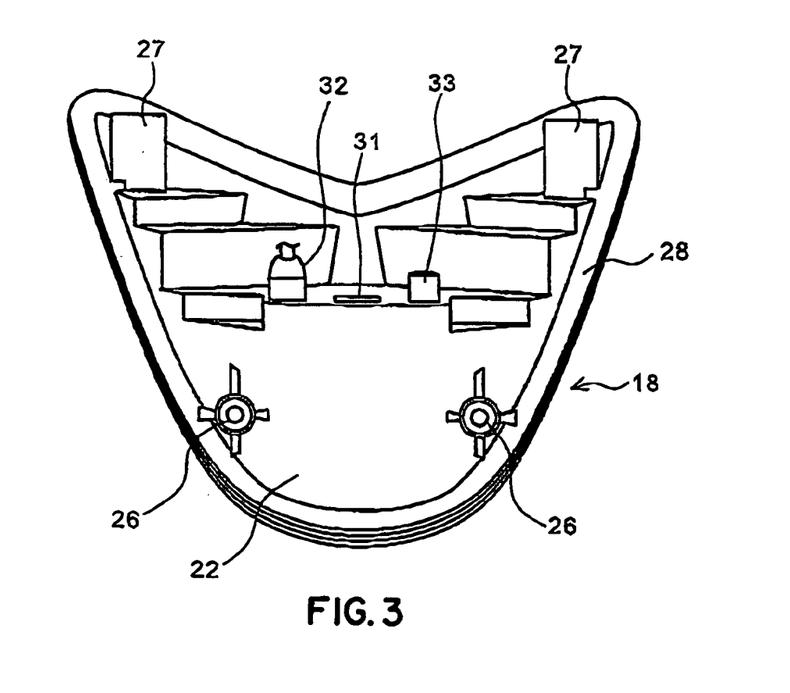
FIG. 3 is a plan view of the tail lamp according to the first embodiment of the present invention.
Figure 4:
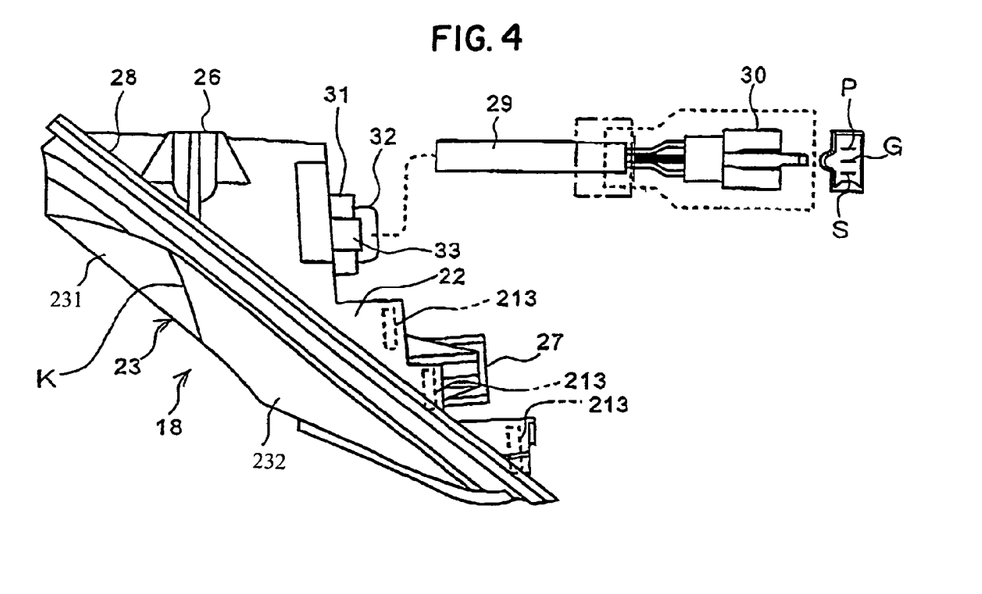
FIG. 4 is a side elevational view of the tail lamp according to the first embodiment of the present invention.
Figure 5:
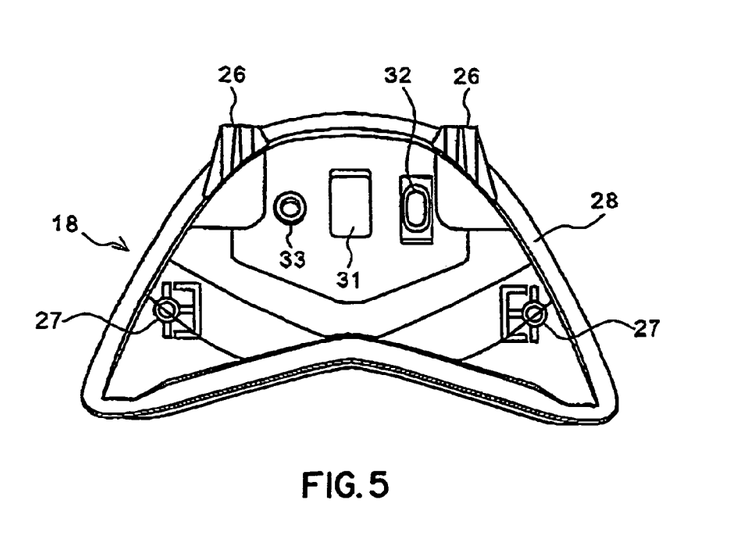
FIG. 5 is a rear elevational view of the tail lamp according to the first embodiment of the present invention.
Figure 6:
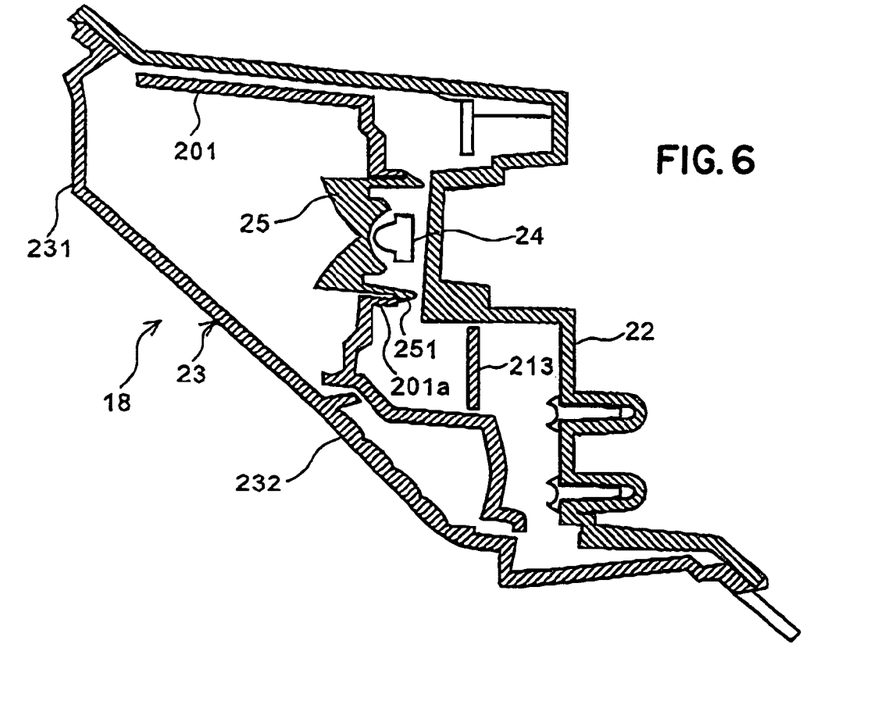
FIG. 6 is a sectional view taken along line A—A of FIG. 1.

Subsequently, a configuration of the tail lamp 18 is described in detail. FIG. 1 is a front elevational view of the tail lamp 18 according to a first embodiment of the present invention (that is, a view of the tail lamp 18 as viewed from the backward of the vehicle body). FIG. 3 is a plan view of the tail lamp 18. FIG. 4 is a right side elevational view of the tail lamp 18. FIG. 5 is a rear elevational view of the tail lamp. FIG. 6 is a sectional view taken along line A—A of FIG. 1. The tail lamp 18 has a generally mountain-like shape wherein it has a comparatively small width (size in the vehicle widthwise direction) at an upper portion thereof but has a comparatively great width at a lower portion thereof as shown in FIG. 1. The tail lamp 18 includes an upper lamp portion 20 serving as a position lamp and a lower lamp portion 21 serving as a stop lamp. In particular, the tail lamp 18 is a combination lamp wherein the position lamp and the stop lamp are integrated into a unitary member, and a base 22 attached to the vehicle body and a lens 23 adhered to a front face of the base 22 by suitable adhering means such as ultrasonic welding.

Particularly, the lens 23 includes an upper lens portion 231 for the position lamp provided at an upper location and a lower lens portion for the stop lamp provided at a lower location, and a boundary line K between the lens portions 231 and 232 forms a V shape. While the lens portions 231 and 232 are disposed at the upper and lower locations for the upper lamp portion 20 and the lower lamp portion 21, respectively, they are positioned adjacent each other to maintain a sense of unity. In particular, the lower lens portion 232 is disposed in such a manner that it envelops the lower half of the upper lens portion 231 so that, upon lighting, the position lamp and the stop lamp further provide a sense of unity.

The upper lamp portion 20 includes a reflector 201, an LED 24 disposed at a focus of the reflector 201, and a lens 25 disposed in front of the LED 24. The LED 24 is secured to the base 22. The lens 25 is fitted in a hole 201a formed in the reflector 201 and is engaged at pawls 251 thereof with an end portion of the hole 201a.

The lower lamp portion 21 includes a plurality of (for example, 12) LEDs 211. The LEDs 211 are disposed generally in a substantially V shape. Six LEDs 211 are disposed in a horizontally elongated fashion in a substantially V shape in a row in an upper stage, and two and one LEDs 211 are disposed in a distributed manner on each of the left and right sides in middle and lower stages, respectively. The LEDs 211 are attached to a board 213 secured to the base 22. The board 213 is provided in a plurality of (for example, 3) stages in the upward and downward direction and is disposed such that a portion thereof in a lower stage, that is, a lower portion thereof, is displaced forwardly with respect to another portion thereof in an upper state, that is, a higher portion thereof. Where the LEDs 211 are disposed three-dimensionally in the forward and backward direction with respect to the vehicle body in this manner, the lamp apparatus can be applied to the shape of the lower face of the lower cover 15 (See FIG. 2), that is, to a sloped face having an ascending inclination at a location rather near to the vehicle body, and besides can be provided with a great area.

The base 22 positioned on the rear face side of the tail lamp 18, that is, positioned forwardly of the vehicle body, has bosses 26, 26 and 27, 27 provided therein into which screws for assembling the base 22 to the rear cover 15 of the vehicle body are screwed. The bosses 26, 26 have threaded holes extending upwardly and downwardly, and the bosses 27, 27 have threaded holes extending horizontally, that is, in the forward and backward directions of the vehicle body. The base 22 has a flat peripheral edge 28. When the base 22 is screwed to the vehicle body, the peripheral edge 28 contacts in an opposing relationship with the rear cover 15 to integrate the tail lamp 18 with the vehicle body.

The LED 24 of the upper lamp portion 20 and the LEDs 211 of the lower lamp portion 21 are connected to a power supply apparatus not shown through a cable 29 and a coupler 30. The coupler 30 contains a terminal P connected to the LED 24, a terminal S connected to the LEDs 211 and a grounding terminal G. A locating face (seat) 31 for the LED 24 is formed on the rear face of the base 22. Also a grommet 32 for retaining the cable 29 and a boss 33 in which a hole for bleeding air in the inside of the tail lamp 18 is formed are provided on the rear face of the base 22.

Figure 7:
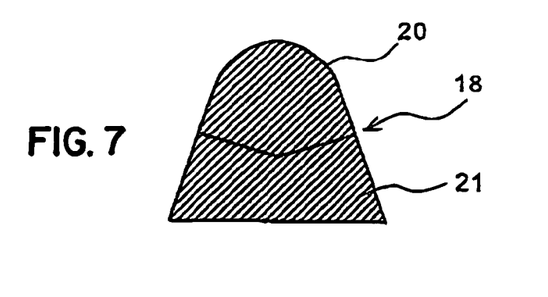
FIG. 7 is a model view showing a lighting pattern upon normal running.
Figure 8:
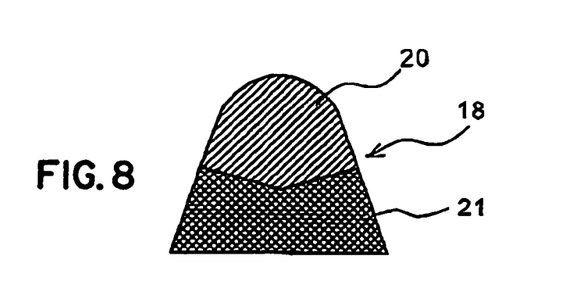
FIG. 8 is a model view showing a lighting pattern upon braking of a vehicle.

FIGS. 7 and 8 are model views showing lighting patterns of the tail lamp. FIG. 7 illustrates a lighting pattern of the tail lamp in a state wherein the entire tail lamp (upper lamp portion 20 and lower lamp portion 21) is lit as a position lamp while FIG. 8 illustrates another lighting pattern in another state wherein the upper lamp portion 20 of the tail lamp is lit as a position lamp while the lower lamp portion is lit as a stop lamp.

In the state of FIG. 7, electric current is supplied such that the LED 24 of the upper lamp portion 20 of the tail lamp 18 and the LEDs 211 of the lower lamp portion 21 are lit with a substantially equal brightness, and the entire tail lamp 18 functions as a position lamp. Meanwhile, in the state of FIG. 8, electric current higher than that when the LEDs 211 of the lower lamp portion 21 are lit as a position lamp is supplied to the LEDs 211 of the lower lamp portion 21 upon braking operation of the vehicle. Accordingly, the upper lamp portion 20 of the tail lamp 18 functions as a position lamp while the lower lamp portion 21 lights more brightly and functions as a stop lamp.

Figure 9:
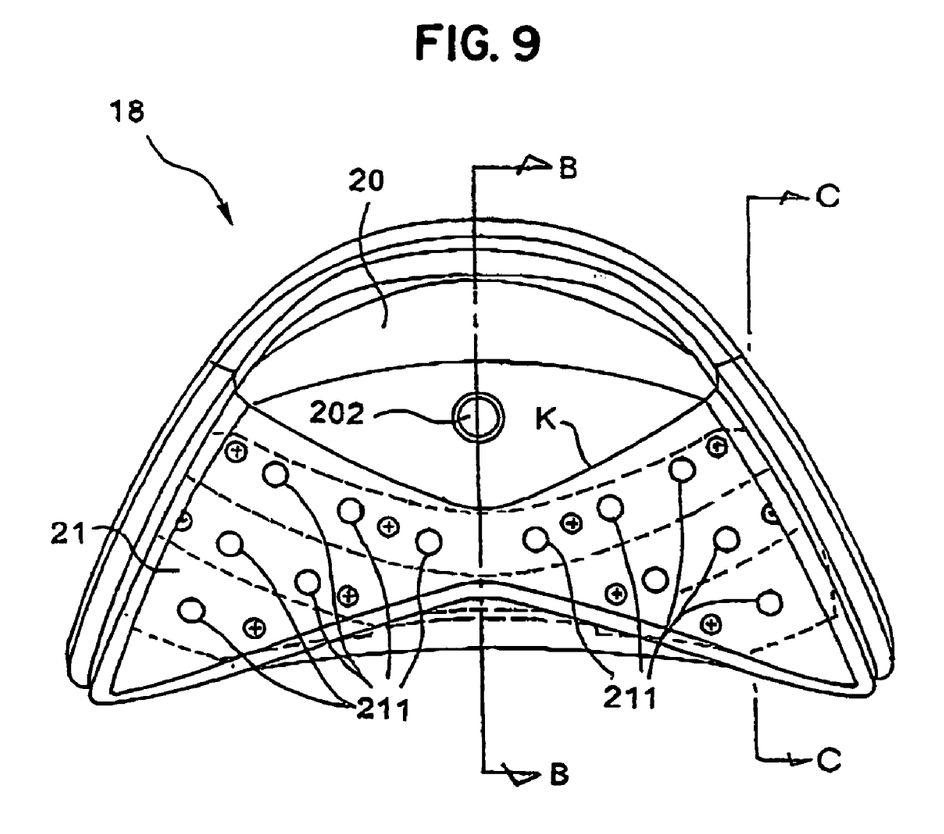
FIG. 9 is a front elevational view of a tail lamp according to a second embodiment of the present invention.
Figure 10:
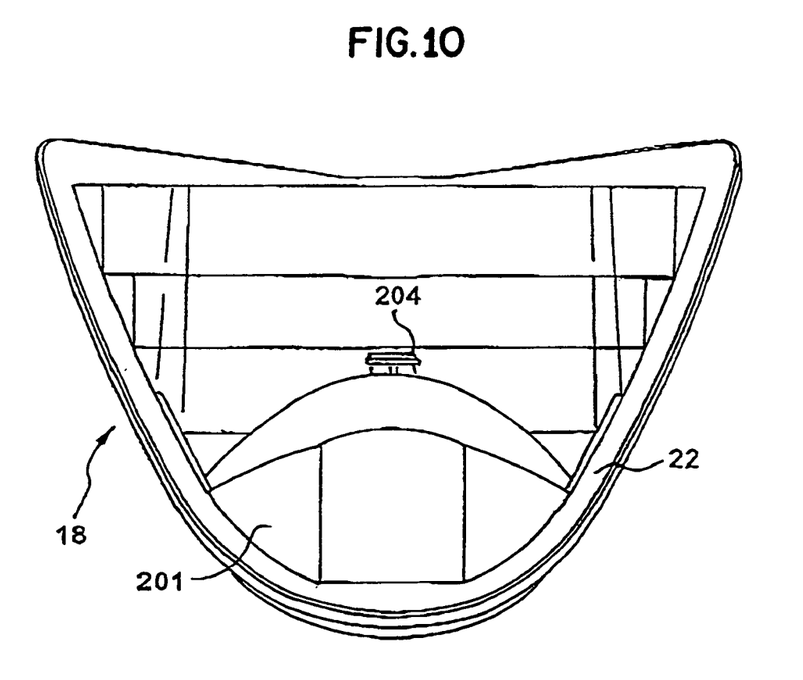
FIG. 10 is a plan view of the tail lamp according to the second embodiment of the present invention.
Figure 11:
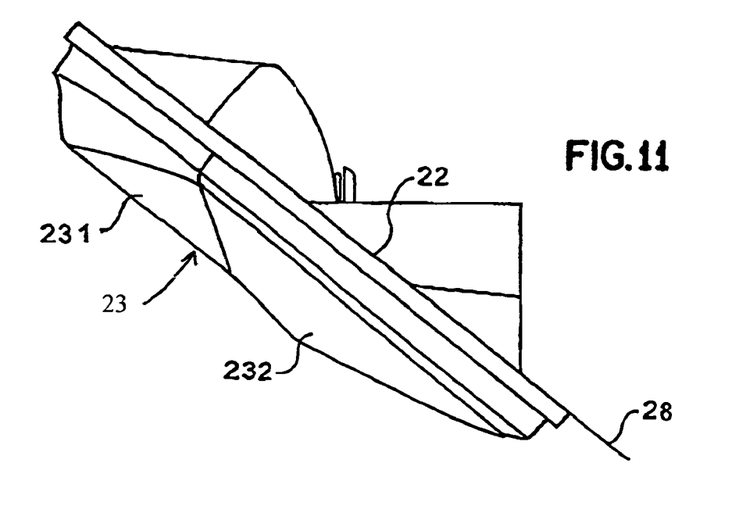
FIG. 11 is a side elevational view of the tail lamp according to the second embodiment of the present invention.
Figure 12:
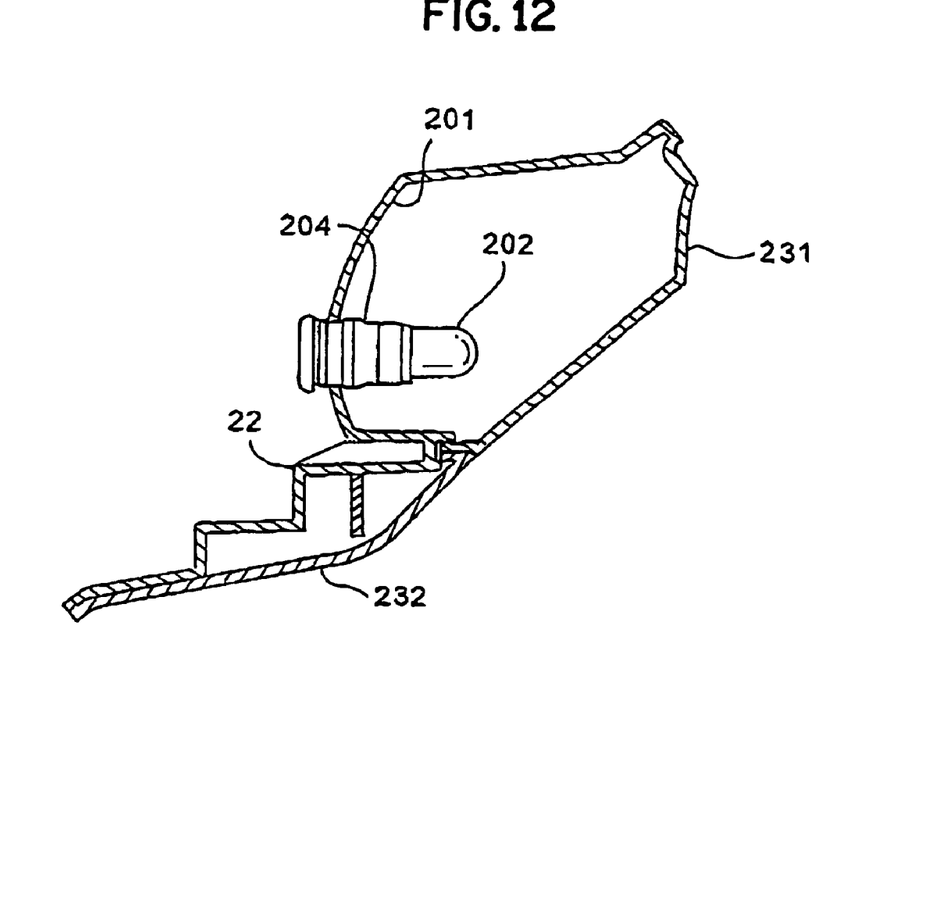
FIG. 12 is a sectional view taken along line B—B of FIG. 9.
Figure 13:
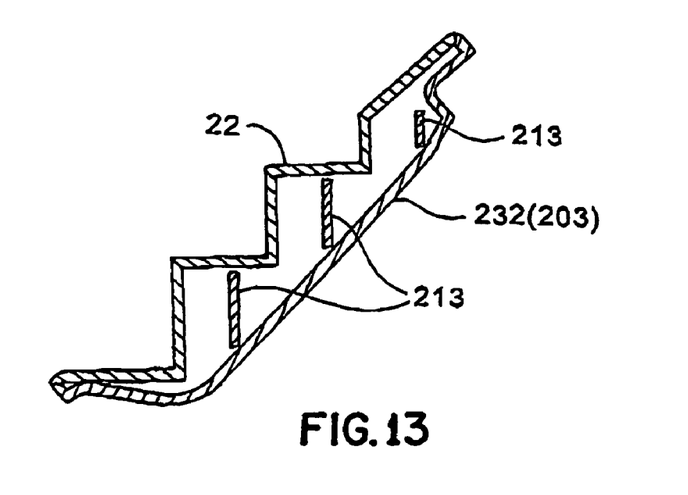
FIG. 13 is a sectional view taken along line C—C of FIG. 9.

Next, a second embodiment of the present invention is described. FIG. 9 is a front elevational view of a tail lamp 18 according to the second embodiment. FIG. 10 is a plan view of the tail lamp 18. FIG. 11 is a right side elevational view of the tail lamp 18. FIG. 12 is a sectional view taken along line B—B of FIG. 9. FIG. 13 is a sectional view taken along line C—C of FIG. 9. As shown in FIG. 9, the tail lamp 18 is a combination lamp having a generally mountain-like shape wherein an upper lamp portion 20 serving as a position lamp and a lower lamp portion 21 serving as a stop lamp are integrated into a unitary member. The tail lamp 18 includes a base 22 attached to a vehicle body and a lens 23 provided on a front face of the base 22.

The upper lamp portion 20 includes a reflector 201 and a bulb 202 disposed at a focus of the reflector 201. An upper lens portion 231 of the lens 23 is attached to a front edge of the reflector 201. The bulb 202 is mounted on a holder 204 secured to the reflector 201 and is connected to a power supply apparatus through a cable and a coupler similarly to that shown in FIG. 4.

The lower lamp portion 21 includes a plurality of LEDs 211, and a lower lens portion 232 disposed forwardly of the LEDs 211. In the present embodiment, 12 LEDs 211 are disposed generally in a substantially V shape. Six LEDs 211 are disposed in a horizontally elongated fashion in a row in an upper stage, and two and one LEDs 211 are disposed in a distributed manner on each of the left and right sides in middle and lower stages, respectively.

While the upper lens portion 231 corresponds to the upper lamp portion 20 and the lower lens portion 232 corresponds to the lower lamp portion 21, they are positioned adjacent each other to maintain a sense of unity. Particularly, since a boundary line K between the lens 20 and the lens 21 has a V shape and the lower lens portion 232 envelopes the lower half of the upper lens portion 231, a further sense of unity is provided upon lighting.

The reflector 201 is formed as part of the base 22, and a board 213 for mounting the LEDs 211 thereon is attached to another portion of the base 22 connecting to the reflector 201. The LEDs 211 are secured to the board 213.

As shown in FIG. 13 (sectional view taken along line C—C of FIG. 9), the board 213 is provided in a plurality of stages in the upward and downward directions, and a lower one of them is disposed in a forwardly displaced relationship of the vehicle body with respect to an upper one of them. Since the LEDs 211 are disposed three-dimensionally in the forward and backward directions on the vehicle body in this manner, the lamp apparatus can be applied to the shape of the lower face of the rear cover 15 (refer to FIG. 2) and besides can be provided with a great area.

The upper lens portion 231 and the lower lens portion 232 are adhered to the base 22 by such suitable joining means as, for example, ultrasonic welding. As can be recognized from FIG. 11, a peripheral edge 28 of the base 22 has a flat face. Accordingly, also a corresponding face of the rear cover 15 which is a joining plane between the base 22 and the rear cover 15 may be a flat plane. In other words, the shape of the body cover can be prevented from being complicated.

Figure 14:
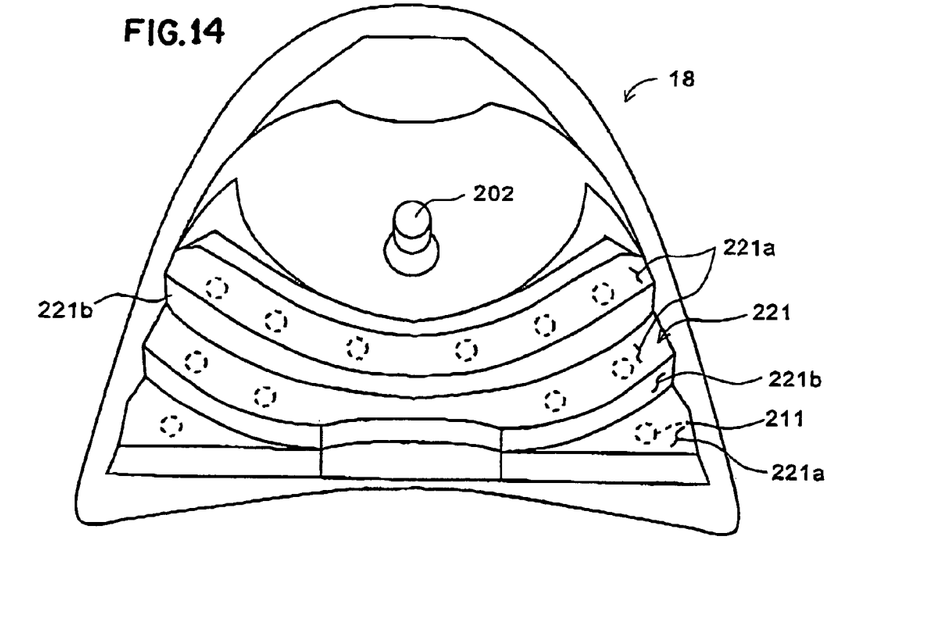
FIG. 14 is a perspective view of the tail lamp according to the second embodiment as viewed from forwardly below.
Figure 15:
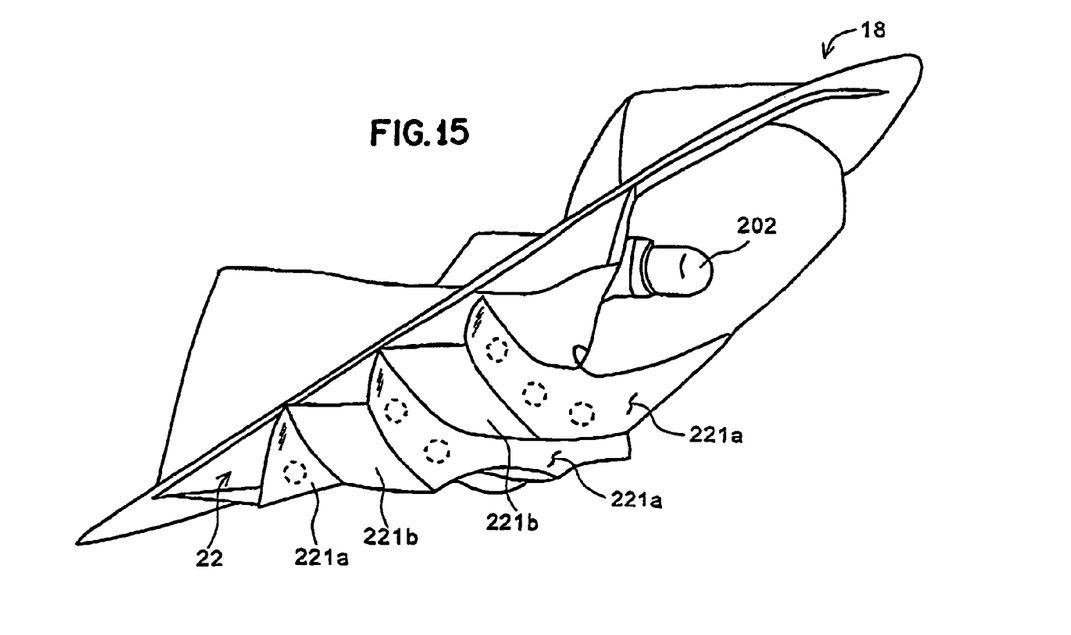
FIG. 15 is a perspective view of the tail lamp according to the second embodiment as viewed from leftwardly below.

FIG. 14 is a perspective view of the tail lamp according to the second embodiment as viewed from forwardly below, and FIG. 15 is a perspective view as viewed from leftwardly below with the lens 23 and the board 213 removed. As shown in both figures, a portion (base portion) 221 of the base 22 at which the board for the LEDs 211 is disposed is formed in a stepwise shape and has a vapor deposited surface. The base portion 221 has vertical faces 221a to which the board 213 is attached. The vertical faces 221a are formed such that they are correctly directed rearwardly of the vehicle body. The vertical faces 221a are disposed such that the highest stage thereof is positioned at a comparatively rear portion of the vehicle body and each lower stage thereof is successively displaced forwardly of the vehicle body. Further, faces 221b orthogonal to the vertical faces 221a have a function of reflecting light of the LEDs 221 to augment the visibility.

Upon normal running, the bulb 202 of the upper lamp portion 20 and the LEDs 211 of the lower lamp portion 21 of the tail lamp 18 of the second embodiment are all lit and play a function of a position lamp suitable for visibility from the backward. Then, in response to a braking operation, higher current than that upon normal running flows to the LEDs 211 of the lower lamp portion 21 so that they are lit brightly, and the LEDs 211 achieve a function as a stop lamp. The lighting patterns are same as those shown in FIGS. 7 and 8. Light emitted from the bulb 202 of the upper lamp portion 20 is reflected by the reflector 201 to make the illumination light have a uniform brightness. Meanwhile, since the LEDs 211 in the lower lamp portion 21 respond in short time to the braking operation and are lit, the lower lamp portion 21 achieves a function as a stop lamp better.

Further, since the lens portion 231 of the upper lamp portion 20 and the lower lens portion 232 of the lower lamp portion 21 in the tail lamp 18 are positioned adjacent each other and the lower lens portion 232 envelopes the lower half of the upper lens portion 231, the sense of unity between the upper lamp portion 20 and the lower lamp portion 21 is augmented. Accordingly, through synthesis of uniform soft light from the bulb and sharp light from the LEDs, a vehicle body image of a new sense is formed.

It is to be noted that, while, in the embodiments described above, the LEDs 211 provided as a stop lamp are arranged in the array including the V-shaped row in the highest stage, the array is not limited to this but may be another array which has a width in the vertical direction, that is, in the upward and downward direction of the vehicle body such as, for example, a U-shaped or O-shaped array.

We claim:

1. A tail lamp for a vehicle, comprising:
   a position lamp, and
   a stop lamp, wherein the stop lamp is disposed below the position lamp and comprises a light emitting diode group disposed in an array including a V-shaped row formed such that the opposite ends of the V-shaped row are positioned higher than the central portion of the V-shaped row.

2. The tail lamp for a vehicle according to claim 1, wherein the light emitting diodes that form the light emitting diode group of the stop lamp are disposed in a plurality of stages from an upper portion toward a lower portion of the vehicle body and are disposed in a successively forwardly displaced relationship to the vehicle body from the upper portion to the lower portion.

3. A tail lamp for a motorcycle, comprising:
   a base member attached to a rear portion of a body of the motorcycle;
   a reflector provided at an upper portion of the base member;
   a position lamp comprising a bulb mounted on the reflector;
   a stop lamp provided at a lower portion of the base member and comprising a plurality of light emitting diodes; and
   a lens adhered to the base member for covering the position lamp and the stop lamp.

4. The tail lamp for a vehicle according to claim 3, wherein the base member on a peripheral edge thereof comprises a flat joining face attached to the rear portion of the vehicle body.

5. The tail lamp for a vehicle according to claim 3, wherein
   the light emitting diodes of the stop lamp are attached to a board provided on the base member, and
   the board is disposed in a plurality of stages from an upper portion to a lower portion of the vehicle body and is disposed in a successively forwardly displaced relationship to the vehicle body from the upper portion to the lower portion.

6. The tail lamp for a vehicle according to claim 3, wherein the lens is divided into a lens for the position lamp and a lens for the stop lamp, and a boundary line between the lens for the stop lamp and the lens for the position lamp above the lens for the stop lamp is formed in a substantially V shape.

7. The tail lamp for a vehicle according to claim 1, wherein the position lamp is formed from light emitting diodes.

8. The tail lamp for a vehicle according to claim 1, wherein electric current is provided to the stop lamp in amounts comprising a first amount and a second amount, wherein the first amount is less than the second amount and is provided when the vehicle is not braked, wherein the second amount is provided when the vehicle is braked, wherein the brightness of the stop lamp varies with the amount of electric current provided, wherein the stop lamp varies with the amount of electric current provided, wherein the stop lamp functions as a second position lamp when the first amount of electricity is provided.

9. A tail lamp for a vehicle, comprising:
   a base member attached to a rear portion of a vehicle body;
   a reflector provided at an upper portion of the base member;
   a stop lamp and a position lamp wherein the stop lamp is disposed below the position lamp and comprises a light emitting diode group disposed in an array, the light emitting diodes that form the light emitting diode group of the stop lamp are disposed in a plurality of stages from an upper portion toward a lower portion of the vehicle body and are disposed in a successively forwardly displaced relationship to the vehicle body from the upper portion to the lower portion.

10. The tail lamp of claim 9, wherein the light emitting diode group includes a V-shaped row formed such that the opposite ends of the V-shaped row are positioned higher than the central portion of the V-shaped row.

11. The tail lamp of claim 9, further comprising a lens adhered to the base member for covering the position lamp and the stop lamp.

12. A tail lamp for a vehicle, comprising:
   a base member attached to a rear portion of a vehicle body;
   a reflector provided at an upper portion of the base member;
   a position lamp attached to the reflector;
   a stop lamp provided at a lower portion of the base member and comprising a plurality of light emitting diodes; and
   a lens adhered to the base member for covering the position lamp and the stop lamp;
   wherein electric current is provided to the stop lamp in amounts comprising a first amount and a second amount, wherein the first amount is less than the second amount and is provided when the vehicle is not braked, wherein the second amount is provided when the vehicle is braked, wherein the brightness of the stop lamp varies with the amount of electric current provided, wherein the stop lamp varies with the amount of electric current provided, wherein the stop lamp functions as a second position lamp when the first amount of electricity is provided.

* * * * *